United States Patent
Bleakley et al.

(10) Patent No.: US 10,319,017 B2
(45) Date of Patent: *Jun. 11, 2019

(54) COLLABORATIVE CO-SHOPPING FOR E-COMMERCE

(71) Applicant: International Business Machines Corporation, Armonk, NY (US)

(72) Inventors: Darrell O. Bleakley, Raleigh, NC (US); Louis M. Demmler, Pittsburgh, PA (US); Aditya A. Desai, Morrisville, NC (US); Michael P. Etgen, Cary, NC (US); Stephen Kenna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 481 days.

This patent is subject to a terminal disclaimer.

(21) Appl. No.: 14/708,626

(22) Filed: May 11, 2015

(65) Prior Publication Data

US 2016/0117748 A1 Apr. 28, 2016

Related U.S. Application Data

(63) Continuation of application No. 14/525,214, filed on Oct. 28, 2014.

(51) Int. Cl.
*G06Q 30/00* (2012.01)
*G06Q 30/06* (2012.01)
(Continued)

(52) U.S. Cl.
CPC ..... *G06Q 30/0623* (2013.01); *G06Q 30/0639* (2013.01); *G06Q 30/0643* (2013.01); *G06Q 50/01* (2013.01); *H04W 4/021* (2013.01)

(58) Field of Classification Search
CPC .............. G06Q 30/0641; G06Q 50/01; G06Q 30/0601; G06Q 30/0631; G06Q 30/0639; G06T 13/40

(Continued)

(56) References Cited

U.S. PATENT DOCUMENTS 7,685,023 B1 * 3/2010 Abraham ........... G06Q 30/0603 705/27.2
7,882,043 B2 2/2011 Bantz et al.
(Continued)

FOREIGN PATENT DOCUMENTS

WO WO2002047001 6/2002

OTHER PUBLICATIONS

Lai, JY., Ulhas, K.R. & Lin, JD. "Assessing and Managing e-commerce service convenience" Inf Syst Front (2014) 16: 273.*

*Primary Examiner* — Brandy A Zukanovich
(74) *Attorney, Agent, or Firm* — Steven M. Greenberg, Esq.; Shutts & Bowen LLP

(57) ABSTRACT

Embodiments of the present provide a method, system and computer program product for collaborative co-shopping in e-commerce. In an embodiment of the invention, a method for collaborative co-shopping in e-commerce includes registering different shoppers in a database for collaborative co-shopping and selecting an item for sale in an e-commerce Web site on behalf of an online shopper. The method also includes determining from the database a location of the item in a brick and mortar store and detecting one of the registered different shoppers in proximity to the item in the brick and mortar store. The method yet further includes establishing a collaborative communicative session through the Web site over a network between the online shopper and the detected one of the registered different shoppers. Finally, the method includes transmitting messages regarding the item between the online shopper and the detected one of the registered different shoppers over the session.

5 Claims, 2 Drawing Sheets

(51) Int. Cl.
*G06Q 50/00* (2012.01)
*H04W 4/021* (2018.01)

(58) Field of Classification Search
USPC .............................................. 705/26.1, 27.1
See application file for complete search history.

(56) References Cited

U.S. PATENT DOCUMENTS

| | | | |
|---|---|---|---|
| 2005/0177446 A1* | 8/2005 | Hoblit | G06Q 10/10 705/26.1 |
| 2013/0054328 A1* | 2/2013 | Chavie | G06Q 50/01 705/14.23 |
| 2013/0103539 A1* | 4/2013 | Abraham | G06Q 10/04 705/26.8 |
| 2013/0211953 A1* | 8/2013 | Abraham | G06Q 30/06 705/26.8 |
| 2015/0006308 A1* | 1/2015 | Lin | G06Q 30/0633 705/26.2 |

* cited by examiner

COLLABORATIVE CO-SHOPPING FOR E-COMMERCE

BACKGROUND OF THE INVENTION

Field of the Invention

The present invention relates to online shopping and more particularly to presenting product recommendations during online shopping.

Description of the Related Art

Electronic commerce or e-commerce is a term generally used for any type of business, or commercial transaction, that involves the transfer of information across the Internet. The backbone of e-commerce is online shopping. Online shopping virtualizes the traditional in-store shopping experience by providing a view to a "store" through a Web browser and a virtualized shopping cart into which the online shopper may place selected items for purchase. At the convenience of the online shopper, the cart can be processed during checkout, payment received and delivery of the purchased items.

During in in-store shopping experience, the shopper may "browse" items for sale. To the extent that others shop the same physical portion of the store, the shopper may interact with other shoppers in order to exchange information regarding items of interest in the store. Oftentimes, shoppers research items of interest in advance through traditional and modern media sources such as magazines, newspaper articles, televised testimonials and the like. With the advent of World Wide Web, shoppers can seek online reviews and discussions of products of interest prior to visiting a store. Likewise, shoppers can seek online reviews and discussions of products of interest prior to or concurrently with engaging in an online shopping session.

Notwithstanding, little can substitute for the opportunity of one shopper to physically interact and consult in person with another during a shopping experience. Online retailers attempt to account for this need by providing various shopping tools during an online shopping session. In this regard, as the online shopper selects items of interest, a presentation of the feedback of other shoppers can be presented in the same display. Further, hyperlinks to extrinsic information pertaining to a selected product can be displayed to the end user, including product video presentations. However, nothing to date acts as a satisfactory substitute for the cooperative experience of two shoppers interacting in respect to an item of interest as is possible in the traditional brick and mortar setting.

BRIEF SUMMARY OF THE INVENTION

Embodiments of the present invention address deficiencies of the art in respect to online shopping and provide a novel and non-obvious method, system and computer program product for collaborative co-shopping in e-commerce. In an embodiment of the invention, a method for collaborative co-shopping in e-commerce is provided. The method includes registering different shoppers in a database for collaborative co-shopping and selecting an item for sale in an e-commerce Web site on behalf of an online shopper. The method also includes determining from the database a location of the item in a brick and mortar store and detecting one of the registered different shoppers in proximity to the item in the brick and mortar store. The method yet further includes establishing a collaborative communicative session through the Web site over a computer communications network between the online shopper and the detected one of the registered different shoppers. Finally, the method includes transmitting messages regarding the item between the online shopper and the detected one of the registered different shoppers over the collaborative communicative session.

In one aspect of the embodiment, selected ones of the registered different shoppers are detected in the brick and mortar store by way of geofencing an area inclusive of at least a portion of the brick and mortar store. In another aspect of the embodiment, selected ones of the registered different shoppers are detected in the brick and mortar store by way of detecting hardware address data in wireless network requests propagated by corresponding mobile devices in the brick and mortar store, each being associated with a corresponding one of the selected ones of the registered different shoppers. In yet another aspect of the embodiment, the collaborative communicative session is a chat session utilizing an avatar presented in the e-commerce Web site as representative of the detected one of the registered different shoppers. As such, the online shopper can be prompted with a suggestion to initiate the collaborative communicative session in response both to the selection of the item and the detection that at least one of the registered different shoppers is in proximity to the item in the brick and mortar store.

In another embodiment of the invention, an e-commerce data processing system is configured for collaborative co-shopping. The system includes a host computing system that includes at least one computer with memory and at least one processor. The system also includes a Web server executing in the host computing system and serving Web pages and program logic combining to form an online store, the online store displaying different selectable items for sale through the online store. Finally, the system includes a collaborative co-shopping module coupled to the Web server and executing in the memory of the host computing system.

The module includes program code enabled upon execution to register different shoppers in a database for collaborative co-shopping, and to respond to a selection in the online store of an item for sale by an online shopper by determining from the database a location of the item in a brick and mortar store, by detecting one of the registered different shoppers in proximity to the item in the brick and mortar store, by establishing a collaborative communicative session through the online store between the online shopper and the detected one of the registered different shoppers and by transmitting messages regarding the item between the online shopper and the detected one of the registered different shoppers over the collaborative communicative session.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for collaborative co-shopping in e-commerce. In accordance with an embodiment of the invention, different shoppers can register with an e-commerce system and can be assigned a unique identifier and as the different shoppers enter and exit different supported brick and mortar stores, the shoppers can be identified and a record recorded indicating a present location of each of the shoppers. Thereafter, an online shopper can select an item of interest in an online store. The selected item can be located in a particular one of the brick and mortar stores and it can be determined if any of the registered shoppers are proximate to the selected item in the particular one of the brick and mortar stores. If so, a collaborative communicative session can be established between a mobile device of a proximate one of the shoppers in the particular one of the brick and mortar stores and the online shopper. Optionally, an avatar can be generated and managed in a user interface to the online store and used to represent the proximate one of the shoppers. Through the collaborative communicative session, the online shopper can engage in a collaborative co-shopping experience as if the online shopper were present in the particular brick and mortar store.

Figure 1:
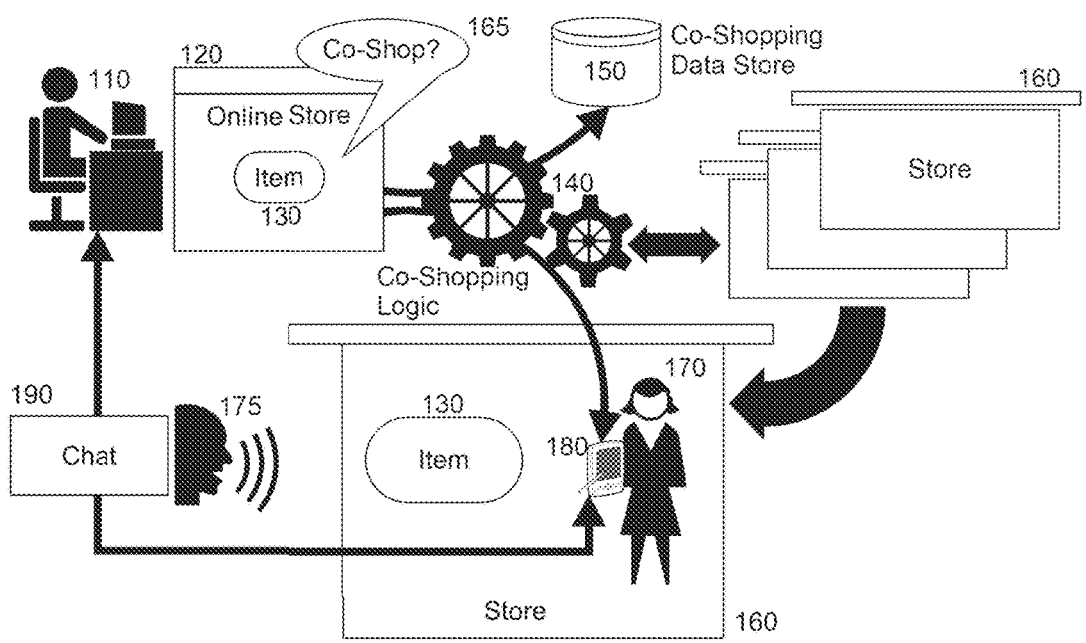
FIG. 1 is a pictorial illustration of a process for collaborative co-shopping in e-commerce.

In further illustration, FIG. 1 pictorially shows a process for collaborative co-shopping in e-commerce. As shown in FIG. 1, an online shopper 110 can access an online store 120 and can select an item 130 offered for sale in the online store 120. Co-shopping logic 140 can respond to the selection of the item 130 by locating in the co-shopping data store 150 one or more physical, brick and mortar stores 160 include the selected item 130. Further, the co-shopping logic 140 can determine whether or not any co-shoppers registered in the co-shopping data store 140 are physically proximate to the selected item 130 within one of the stores 160.

Thereafter, the co-shopping logic 140 can select one of the co-shoppers 170 present within one of the stores 160 and proximate to the selected item 130. In this regard, the co-shopping logic 140 can issue a prompt 165 to the online shopper to establish a co-shopping session 190 with the one of the co-shoppers 170. Finally, the co-shopping session 190 can be established as between the online shopper 110 and a mobile device 180 of the one of the co-shoppers 170. The co-shopping session 190 can include a textual, audio, or video chat session, or any combination thereof and the one of the co-shoppers 170 can be represented in the online store 120 as a particular avatar 175.

Figure 2:
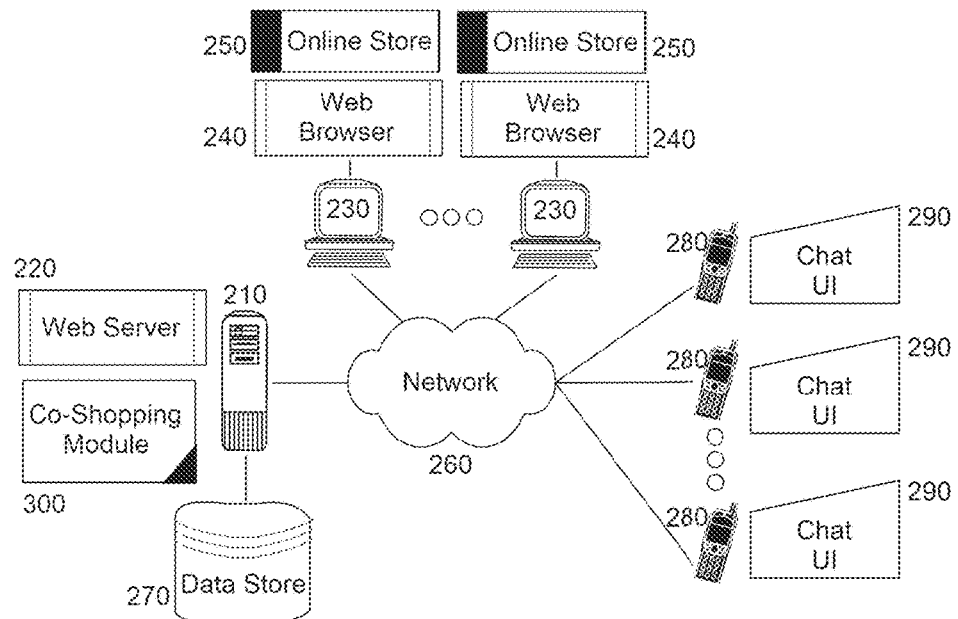
FIG. 2 is a schematic illustration of an e-commerce data processing system configured for collaborative co-shopping in e-commerce; and, FIG. 3 is a flow chart illustrating a process for collaborative co-shopping in e-commerce.

The process described in connection with FIG. 1 can be implemented within an e-commerce data processing system. In further illustration, FIG. 2 schematically shows an e-commerce data processing system configured for collaborative co-shopping. The system can include a host computing system 210 that includes one or more computers each with memory and at least one processor. The host computing system 210 can support the operation of a Web server 220 serving Web pages, associated resources and programmatic logic forming the basis of an online store 250 rendered in different Web browsers 240 displayed in different client computers 230 communicatively coupled to the host computing system 210 over a computer communications network 260.

Of note, a co shopping module 300 can be coupled to the Web server 220. The co-shopping module 300 can include program instructions that when executed in the memory of the host computing system 210, is enabled to respond to the selection in the online store 250 by an online shopper of a particular item listed in the data store 270 by locating an association in the data store 270 of the selected item with one or more brick and mortar stores. The program instructions further are enabled to determine whether or not one or more registered co-shoppers are contemporaneously present in one of the aforementioned brick and mortar stores. If so, the program instructions when executed can establish a collaborative communicative session between a mobile device 280 of a selected one of the co-shoppers such that messages can be exchanged from a portion of the online store 250 and a chat user interface 290 of the mobile device 280.

Figure 3:
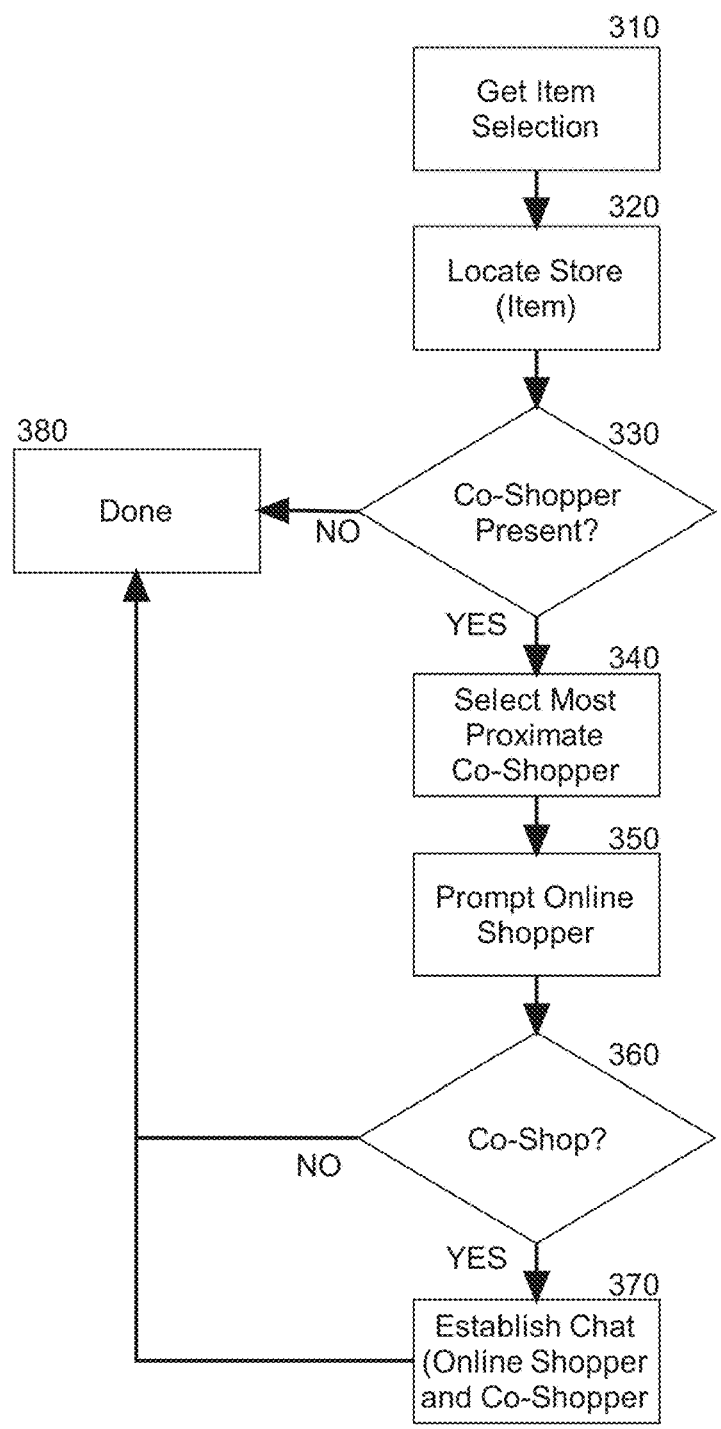

In even yet further illustration of the operation of the co-shopping module, FIG. 3 is a flow chart illustrating a process for collaborative co-shopping in e-commerce. Beginning in block 310, an item can be selected in a Web page of an online store by an online shopper. In block 320, the item can be located as being physically present in a particular brick and mortar store. In decision block 330, it can be determined whether or not a registered co-shopper is contemporaneously physically present proximate to the item in the particular brick and mortar store.

In this regard, a registered co-shopper can be detected within the bounds of a brick and mortar store based upon any number of technical methods, including establishing a geofence about an area inclusive of at least a portion of the store and detecting when a registered co-shopper enters within those bounds as reported by a positioning system disposed in a mobile device of the co-shopper. Alternatively, the co-shopper can be detected within the bounds of a brick and mortar store based upon a wireless network request issued by the mobile device of the co-shopper that includes a hardware address such as a MAC address unique to the mobile device and thus the co-shopper.

In any event, in decision block 330, if it is determined that a co-shopper is present in proximity to the item in the brick and mortar store, in block 340 the most proximate of all co-shoppers deemed proximate to the item can be selected and in block 350, the online shopper can be prompted to initiate a co-shopping session with the selected co-shopper. In decision block 360, it can be determined whether or not the online shopper has decided to initiate the co-sopping session. If so, in block 370 a chat session can be established as between the co-shopper and the online shopper and messages can be exchanged there between through the chat session. Finally, the process can end in block 380.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for collaborative co-shopping in e-commerce, the method comprising:
   registering different shoppers in a database for collaborative co-shopping;
   receiving from a Web page a selection of an item for sale in an e-commerce Web site on behalf of an online shopper;
   determining from the database a location of the item in brick and mortar stores and further identifying multiple ones of the registered different shoppers contemporaneously present in proximity to the selected item in a corresponding one of one or more brick and mortar stores;
   computing a distance of each one of the multiple ones of the registered different shoppers from the item in each corresponding one of the brick and mortar stores;
   selecting a most proximate one of the identified multiple ones of the registered different shoppers to the selected the item in a corresponding one of the brick and mortar stores;
   establishing a collaborative communicative session through the Web site over a computer communications network between the Web browser of the online shopper and a mobile computing device of the selected one of the multiple ones of the registered different shoppers; and,
   transmitting messages by the device regarding the item between the online shopper and the selected one of the multiple ones of the registered different shoppers over the collaborative communicative session.

2. The method of claim 1, wherein selected ones of the registered different shoppers are detected in the brick and mortar store by way of geofencing an area inclusive of at least a portion of the brick and mortar store.

3. The method of claim 1, wherein selected ones of the registered different shoppers are detected in the brick and mortar store by way of detecting hardware address data in wireless network requests propagated by corresponding mobile devices in the brick and mortar store, each being associated with a corresponding one of the selected ones of the registered different shoppers.

4. The method of claim 1, wherein the collaborative communicative session is a chat session utilizing an avatar presented in the e-commerce Web site as representative of the selected one of the multiple ones of the registered different shoppers.

5. The method of claim 4, wherein the online shopper is prompted with a suggestion to initiate the collaborative communicative session in response both to the selection of the item and the detection that at least one of the registered different shoppers is in proximity to the item in the brick and mortar store.

* * * * *